(12) United States Patent
Chen et al.

(10) Patent No.: US 11,938,581 B2
(45) Date of Patent: Mar. 26, 2024

(54) POWER DEVICE (71) Applicant: Nanjing Chervon Industry Co., Ltd., Nanjing (CN)

(72) Inventors: Zhifeng Chen, Nanjing (CN); Dianbo Zhu, Nanjing (CN); Bo Zhang, Nanjing (CN); Xia Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 114 days.

(21) Appl. No.: 17/526,099

(22) Filed: Nov. 15, 2021

(65) Prior Publication Data
US 2022/0152760 A1   May 19, 2022

(30) Foreign Application Priority Data

Nov. 18, 2020 (CN) .......................... 202011294600.5

(51) Int. Cl.
*B27C 3/02* (2006.01)
*B23Q 3/02* (2006.01)
*B27C 5/02* (2006.01)

(52) U.S. Cl.
CPC . *B23Q 3/02* (2013.01); *B27C 5/02* (2013.01)

(58) Field of Classification Search
CPC ...... B27F 1/02; B27F 1/04; B27F 1/08; B27F 1/10; B27F 1/12; B27F 1/16; B27F 5/00; B27F 5/02; B27F 5/12; B23Q 3/02; B27C 5/00; B27C 5/02; B27C 5/04; B27C 5/06; B27C 5/10
See application file for complete search history.

(56) References Cited

U.S. PATENT DOCUMENTS

| 5,715,880 | A  | * | 2/1998 | Tucker ................... | B23Q 3/005 |
| | | | | | 144/286.5 |
| 6,382,276 | B1 | * | 5/2002 | Daniels ................... | B27C 5/02 |
| | | | | | 144/1.1 |
| 7,409,973 | B2 | * | 8/2008 | Hyde ....................... | B27C 5/02 |
| | | | | | 144/286.5 |
| 7,785,049 | B2 | * | 8/2010 | Radermacher ........... | B27C 5/02 |
| | | | | | 144/286.5 |
| 7,921,888 | B2 | * | 4/2011 | Sommerville ........... | B27C 5/02 |
| | | | | | 144/286.5 |
| 7,934,961 | B2 | * | 5/2011 | Damodharan ..... | H01R 13/2492 |
| | | | | | 439/862 |
| 7,946,318 | B2 | * | 5/2011 | Carroll .................... | B27C 5/10 |
| | | | | | 144/136.95 |
| 9,346,144 | B2 | * | 5/2016 | Tan ......................... | B25F 5/021 |
| 9,403,221 | B2 | * | 8/2016 | Reinwald ................ | B27C 5/10 |

(Continued)

*Primary Examiner* — Matthew Katcoff
(74) *Attorney, Agent, or Firm* — Greenberg Traurig, LLP (57) ABSTRACT A power device includes a power tool, a mounting plate, a mounting table, a positioning assembly, and a locking assembly. The positioning assembly includes a positioning piece. A positioning space is formed between the positioning piece and the mounting table. An end of the mounting plate is enabled to be inserted into the positioning space so that the mounting plate is pre-positioned. The locking assembly includes a movable piece and a locking piece. The movable piece includes a support position where the mounting plate is supported and an unlocked position where support for the mounting plate is released. The locking piece fixes at least the mounting plate to the mounting table.

18 Claims, 9 Drawing Sheets (56) References Cited

U.S. PATENT DOCUMENTS

| | | | | |
|---|---|---|---|---|
| 11,173,624 B2* | 11/2021 | Hall | ............ | B27C 5/10 |
| 2005/0230003 A1* | 10/2005 | Radermacher | ............ | B27C 5/02 |
| | | | | 144/286.5 |
| 2011/0073335 A1* | 3/2011 | Kato | ............ | B25F 3/00 |
| | | | | 173/217 |
| 2021/0023664 A1* | 1/2021 | Plöckl | ............ | B23Q 1/623 |

* cited by examiner

ID
POWER DEVICE

RELATED APPLICATION INFORMATION

This application claims the benefit under 35 U.S.C. § 119(a) of Chinese Patent Application No. CN 202011294600.5, filed on Nov. 18, 2020, which is incorporated by reference in its entirety herein.

BACKGROUND

A router is a power tool for finishing woods, such as cutting, grooving, and trimming woods. The router needs to be installed on a router table when in use, and a wood moves stably on the router table so that the router can finish the wood.

In the existing art, screws and other connection pieces are generally used to directly fix and install the router on the router table. This installation method not only has a complicated connection process but also has low installation efficiency; moreover, since multiple screws are utilized, it is difficult to ensure that the router is flush with a table top of the router table after connected so that the wood is jammed during machining and finally machined with low precision.

SUMMARY

A power device includes a power tool, a mounting plate, and a mounting table. The mounting plate is detachably connected to the power tool. The mounting table is for installation of the mounting plate. The power device further includes a positioning assembly and a locking assembly. The positioning assembly includes a positioning piece, where a positioning space is formed between the positioning piece and the mounting table, and an end of the mounting plate is enabled to be inserted into the positioning space so that the mounting plate is pre-positioned. The locking assembly includes a movable piece and a locking piece, where the movable piece includes a support position where the mounting plate is supported and an unlocked position where support for the mounting plate is released, and the locking piece fixes at least the mounting plate to the mounting table.

In one example, the movable piece is provided with a guide groove, the mounting table is provided with a guide rod, the guide rod passes through the guide groove, and the movable piece is movable with respect to the mounting table through the guide groove.

In one example, the locking piece includes bolts, where the bolts fixedly connect the mounting plate to the mounting table.

In one example, the locking piece includes a first screw rod and a first nut screwed to the first screw rod, the first screw rod is fixedly connected to the mounting table, and the first nut is enabled to be screwed to the first screw rod, so as to lock the movable piece and the mounting table.

In one example, the power device further includes an auxiliary locking assembly, where the auxiliary locking assembly includes a pressing piece and an auxiliary locking piece, the pressing piece is capable of abutting against a side of the mounting plate facing away from the mounting table, and the auxiliary locking piece is capable of locking the pressing piece and the mounting table.

In one example, the auxiliary locking piece includes a second screw rod and a second nut screwed to the second screw rod, the second screw rod is fixedly connected to the mounting table, and the second nut is enabled to be screwed to the second screw rod, so as to abut against the pressing piece.

In one example, the pressing piece and the positioning piece are disposed on the same side of the mounting plate.

In one example, a foolproof assembly is disposed between the mounting table and the mounting plate, the foolproof assembly includes a protrusion and a groove, one of the protrusion or the groove is disposed on the mounting table, the other of the protrusion or the groove is disposed on the mounting plate, and the protrusion is inserted into the groove while the end of the mounting plate is inserted into the positioning space.

In one example, the mounting plate is provided with a plurality of sets of positioning holes, each of the plurality of sets of positioning holes are arranged in a circle, and the plurality of sets of positioning holes are distributed on circles of different diameters.

In one example, the power device further includes a depth adjustment assembly configured to adjust an operation depth of the power tool, where the mounting plate is provided with an escape hole that allows the depth adjustment assembly to pass through.

During installation, the end of the mounting plate is inserted into the positioning space so that the mounting plate is pre-positioned, the movable piece is moved to the support position, and the mounting plate and the mounting table are locked through the locking piece. Therefore, the mounting plate is pre-supported by the movable piece so that a user does not need to hold and support the mounting plate by hand, thereby improving convenience of installation. During disassembly, after the mounting plate and the mounting table are unlocked through the locking piece, due to pre-support of the positioning piece and the movable piece, the mounting plate and the power tool will not fall so that the user moves the movable piece to the unlocked position and then pulls the mounting plate out of the positioning space. The power device is installed by simple operations and with high efficiency and can be used immediately after installation. Since the positioning space pre-positions the mounting plate and the movable piece pre-supports the mounting plate, after assembly is completed, it can be ensured that a router is flush with a desktop of a router table without the need to adjust flatness, thereby ensuring the machining precision.

DETAILED DESCRIPTION

Technical solutions of the present disclosure will be described clearly and completely below in conjunction with drawings. The examples described are part, not all, of examples of the present disclosure. Based on the examples of the present disclosure, all other examples obtained by those of ordinary skill in the art without creative work are within the scope of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions.

In the description of the present disclosure, it is to be noted that terms "mounted", "joined", and "connected" are to be understood in a broad sense unless otherwise expressly specified and limited. For example, the term "connected" may refer to "securely connected" or "detachably connected", may refer to "mechanically connected" or "electrically connected" or may refer to "connected directly", "connected indirectly through an intermediary" or "connected inside two components". For those of ordinary skill in the art, specific meanings of the preceding terms in the present disclosure may be understood based on specific situations.

As shown in FIGS. 1 to 7, this example provides a power device. The power device includes a power tool and a mounting table 200. The power tool is installed to the mounting table 200 to complete a specific operation. Based on different power tools, the power device can perform different operations to achieve different tasks. In this example, an example in which the power tool is a router and the mounting table 200 is a router table is used. The router is a power tool capable of finishing woods, such as cutting, grooving, and trimming woods.

Figure 1:
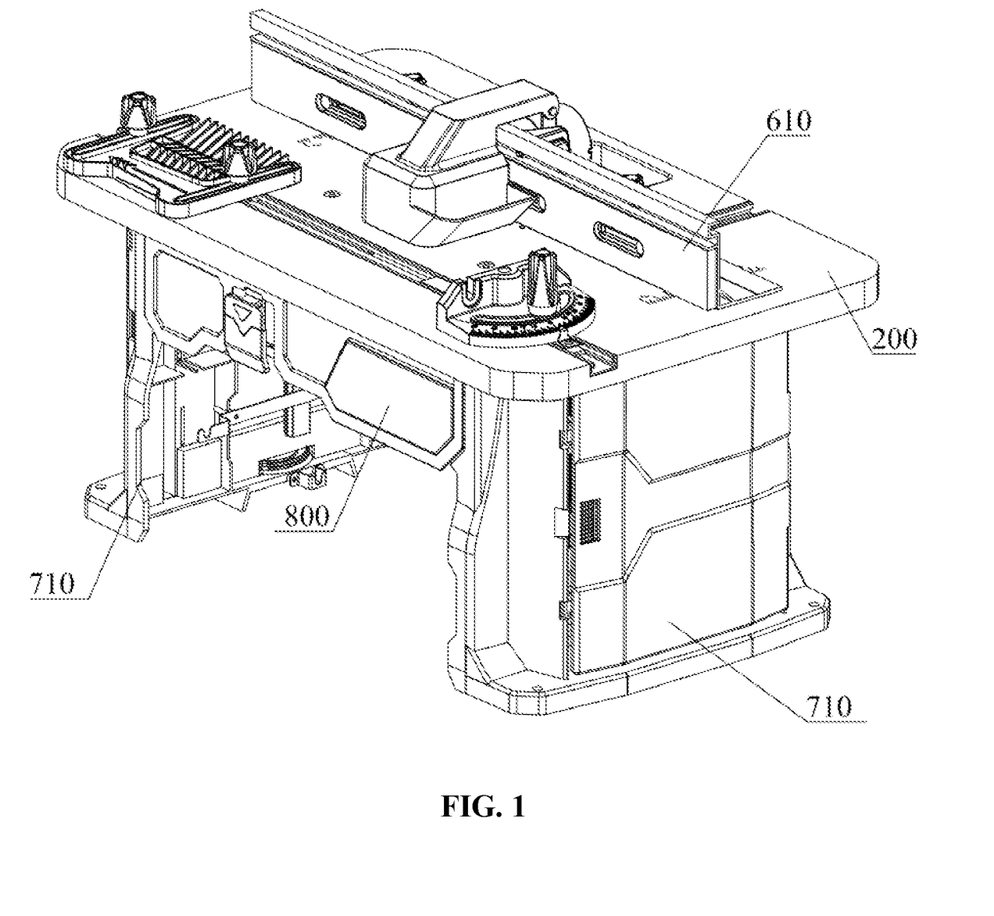
FIG. 1 is a structure view of a power device according to an example of the present disclosure.
Figure 2:
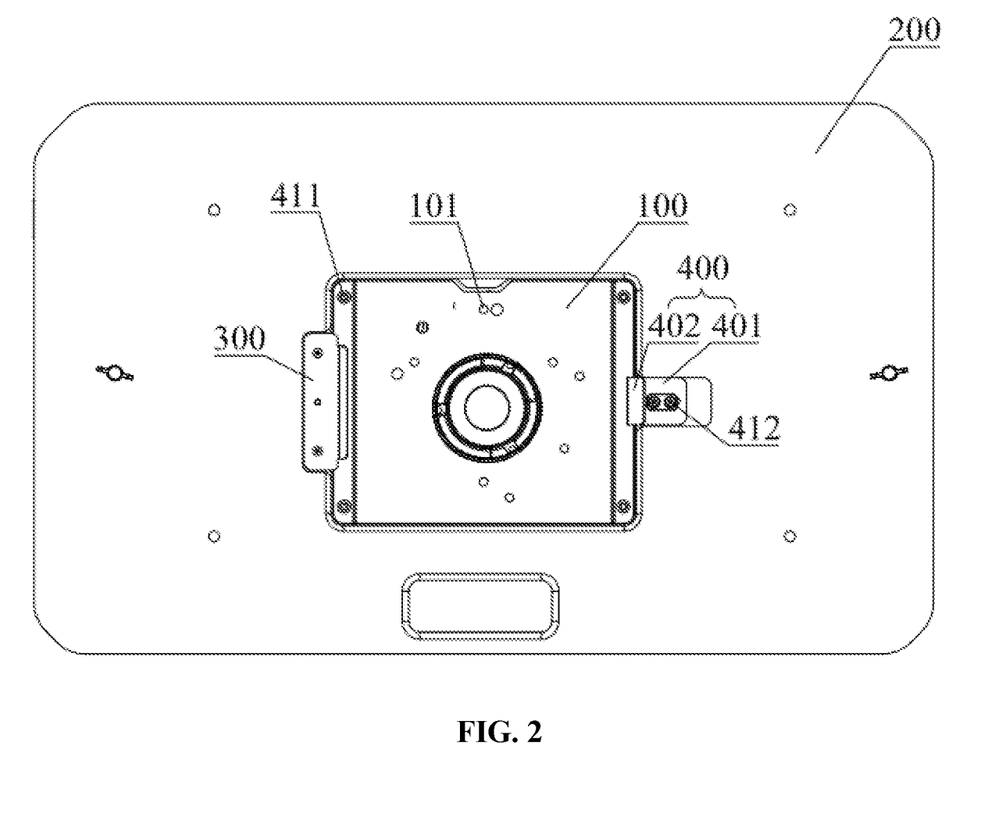
FIG. 2 is a view illustrating the assembly of a mounting plate and a mounting table of a power device according to an example of the present disclosure.
Figure 3:
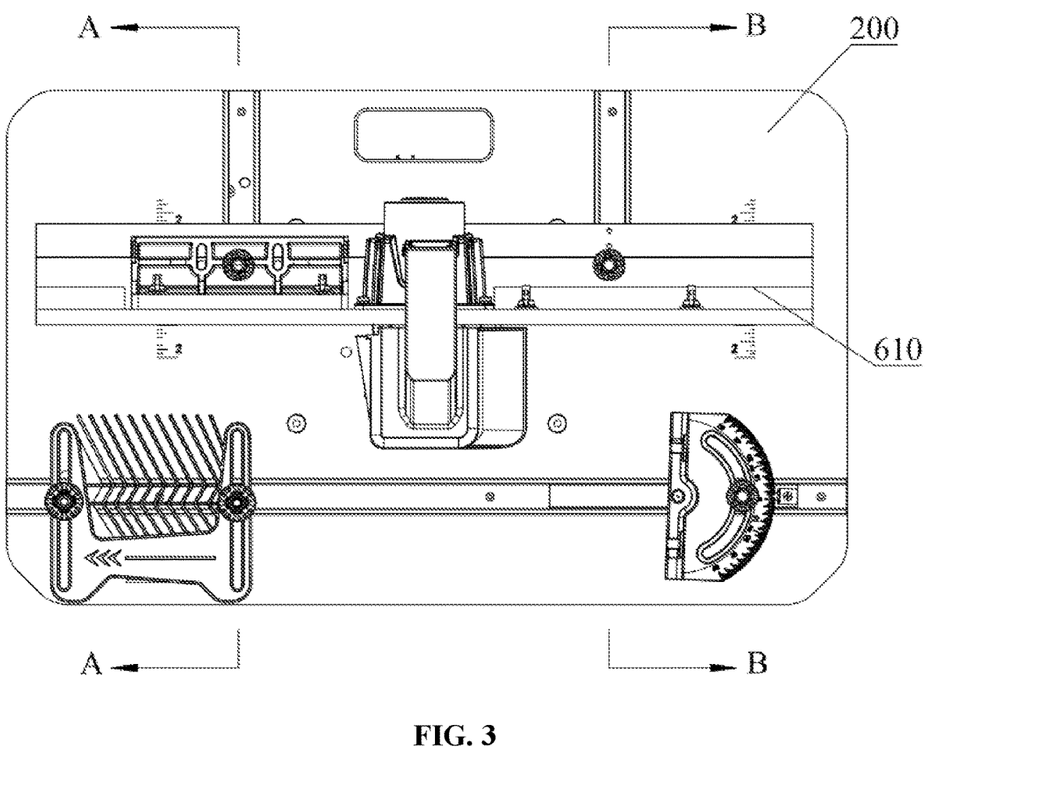
FIG. 3 is a top view of a power device according to an example of the present disclosure.
Figure 4:
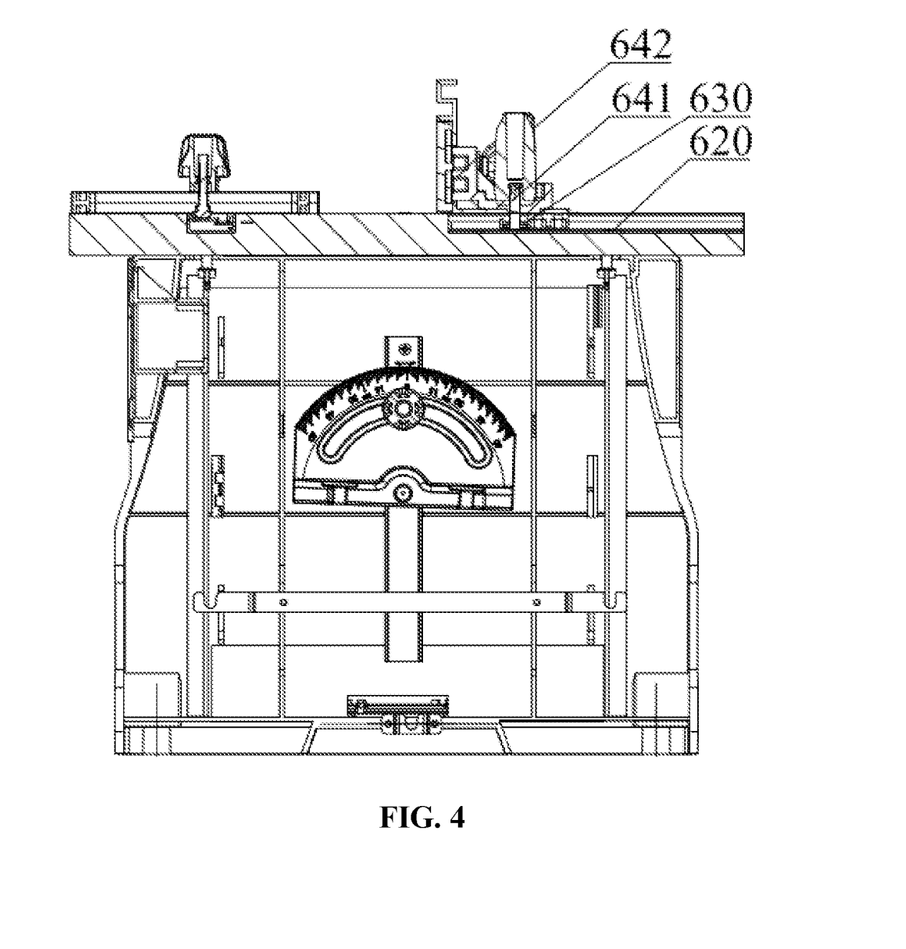
FIG. 4 is a sectional view taken along A-A of FIG. 3.
Figure 5:
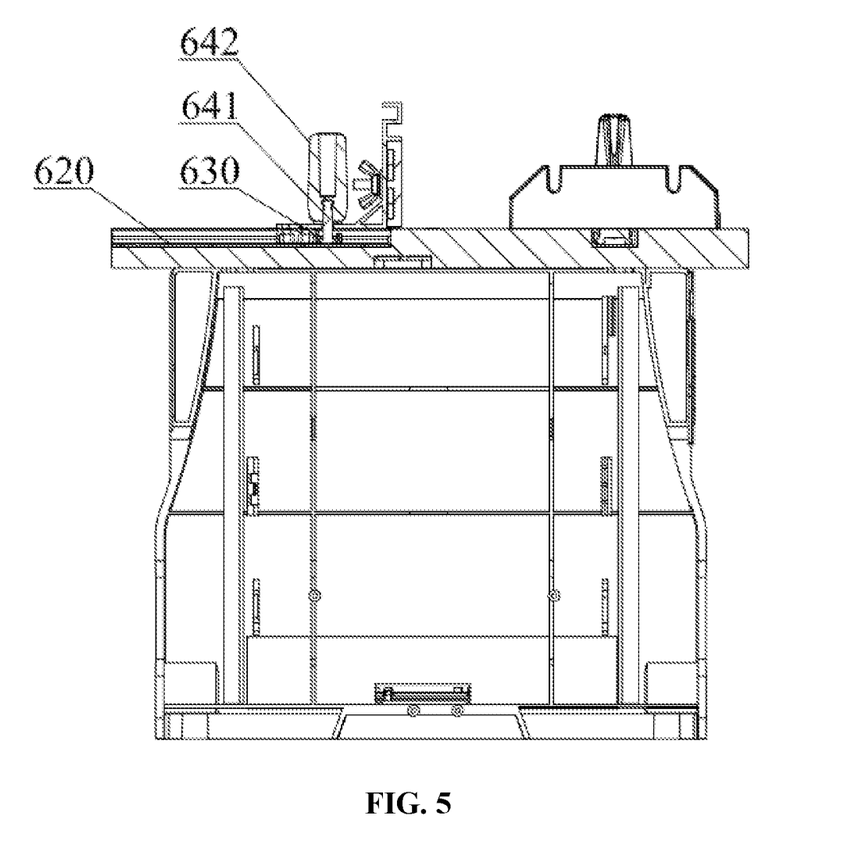
FIG. 5 is a sectional view taken along B-B of FIG. 3.

The power device further includes a mounting plate 100 configured to detachably connect the router to the router table. Specifically, the router is detachably connected to the mounting plate 100. Optionally, the mounting plate 100 is provided with multiple positioning holes 101, the router is provided with multiple connection holes, the multiple positioning holes 101 and the multiple connection holes are arranged in a ring or rectangle according to requirements, and each of multiple screws passes through a respective one of the multiple positioning holes 101 and a respective one of the multiple connection holes so that the router is detachably connected to the mounting plate 100. To expand the scope of use and enable routers of different specifications to be installed on the mounting plate 100 of one specification, the mounting plate 100 is provided with multiple sets of positioning holes 101, each set of positioning holes 101 are arranged in a circle, and the multiple sets of positioning holes 101 are distributed on circles of different diameters so that when the routers of different specifications are installed, different sets of positioning holes 101 can be selected for use according to positions of the connection holes on the router.

After the assembly of the router and the mounting plate 100 is completed, the mounting plate 100 is connected to the router table.

The power device further includes a positioning assembly and a locking assembly. The positioning assembly includes a positioning piece 300. A positioning space is formed between the positioning piece 300 and the mounting table 200. An end of the mounting plate 100 can be inserted into the positioning space so that the mounting plate 100 is pre-positioned. The locking assembly includes a movable piece 400 and a locking piece. The movable piece 400 includes a support position where the mounting plate 100 is supported and an unlocked position where support for the mounting plate 100 is released. The locking piece fixes at least the mounting plate 100 to the mounting table 200.

During installation, the end of the mounting plate 100 is inserted into the positioning space so that the mounting plate 100 is pre-positioned, the movable piece 400 is moved to the support position, and the mounting plate 100 and the mounting table 200 are locked through the locking piece. Therefore, the mounting plate 100 is pre-supported by the movable piece 400 so that a user does not need to hold and support the mounting plate 100 by hand, thereby improving convenience of installation. During disassembly, after the mounting plate 100 and the mounting table 200 are unlocked through the locking piece, due to pre-support of the positioning piece 300 and the movable piece 400, the mounting plate 100 and the power tool will not fall so that the user moves the movable piece 400 to the unlocked position and then withdraws the mounting plate 100 from the positioning space. The power device is installed by simple operations and with high efficiency and can be used immediately after installation. Since the positioning space pre-positions the mounting plate 100 and the movable piece 400 pre-supports the mounting plate 100, after assembly is completed, it can be ensured that the router is flush with a desktop of the router table without the need to adjust flatness, thereby ensuring machining precision.

Specifically, an installation groove is disposed on a bottom surface of the mounting table 200, and the mounting plate 100 can be placed in the installation groove. The positioning space is enclosed between the positioning piece 300 and the installation groove. In this example, the mounting plate 100 is a rectangular plate, the installation groove is correspondingly configured to be a rectangular groove, and a dimension of the rectangular groove is slightly greater than a dimension of the rectangular plate, so as to reduce the difficulty of installing the mounting plate 100 into the installation groove. The positioning piece 300 may be plate-shaped, block-shaped, or in other shapes, and the positioning piece 300 and the mounting table 200 may be locked through screws.

To smoothly position the mounting plate 100 in the installation groove, a foolproof assembly is disposed between the mounting table 200 and the mounting plate 100, the foolproof assembly includes a protrusion and a groove, one of the protrusion or the groove is disposed on the mounting table 200, the other of the protrusion or the groove is disposed on the mounting plate 100, and the protrusion is inserted into the groove while the end of the mounting plate 100 is inserted into the positioning space. The cooperation between the protrusion and the groove can limit the end of the mounting plate 100.

In this example, the locking piece includes bolts 411, installation holes are disposed on a periphery of the mounting plate 100, such as four corners of the mounting plate 100, and the bolts 411 are threadedly connected to the mounting table 200 through the installation holes. The mounting plate 100 and the mounting table 200 are locked through the bolts 411. The positioning piece 300 and the movable piece 400 are respectively disposed at two ends of the mounting plate 100. It can be seen that one end of the mounting plate 100 is pre-positioned by the positioning space and the other end of the mounting plate 100 abuts against the movable piece 400 to be supported, thereby improving efficiency of installation and disassembly.

Optionally, the movable piece 400 is provided with a guide groove, the mounting table is provided with a guide rod 412, the guide rod 412 passes through the guide groove, and the movable piece 400 can move with respect to the mounting table 200 through the guide groove so as to adjust its position. When the mounting plate 100 is installed in the installation groove, the movable piece 400 may move inward to block an end portion of the mounting plate 100. At this time, the movable piece 400 and the positioning piece 300 together pre-support the mounting plate 100 so that the mounting plate 100 is prevented from falling down and the user does not need to hold the mounting plate 100 by hand when installing the bolts 411 to fix the mounting plate 100.

In this example, the movable piece 400 is plate-shaped and includes a connection portion 401 and a pulling portion 402 connected at an angle. The connection portion 401 and the pulling portion 402 are both rectangular and plate-shaped structures, and the angle between the connection portion 401 and the pulling portion 402 may be an acute angle, a right angle, or an obtuse angle according to requirements. The guide groove is disposed on the connection portion 401, and the connection portion 401 is slidably connected to the guide rod 412. The user may pull and displace the movable piece 400 by applying a force to the pulling portion 402.

As shown in FIGS. 3 to 6, the power device further includes a support grid structure 610, where the support grid structure 610 is disposed on the desktop of the router table, that is, on a top surface of the mounting table 200. The support grid structure 610 is mainly configured to provide guidance for movement of a wood and provide positioning when the router machines the wood.

Figure 6:
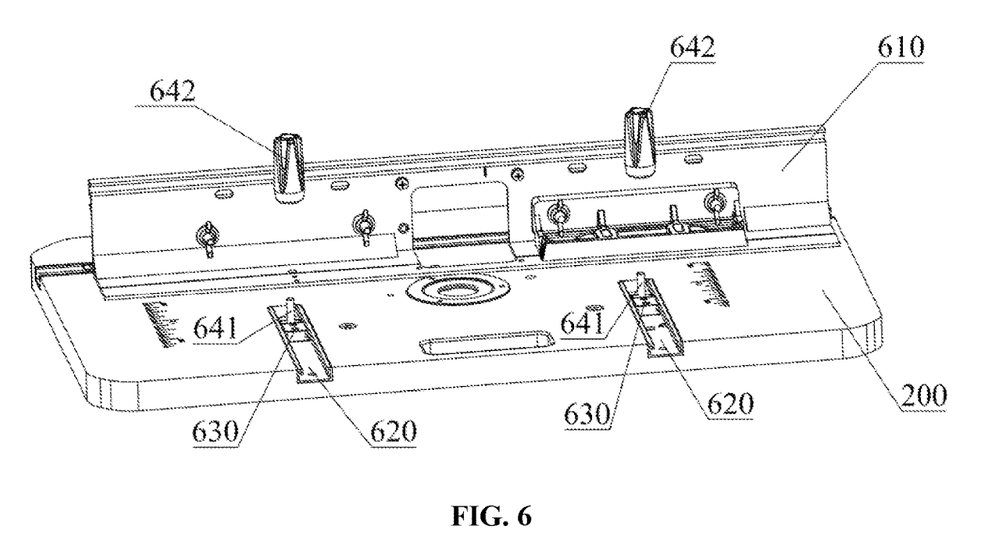
FIG. 6 is a view illustrating the assembly of a support grid structure and a mounting table of a power device according to an example of the present disclosure.

To connect the support grid structure 610 to the router table and facilitate the adjustment of a position of the support grid structure 610 on the router table so as to improve the flexibility of use of the power device, a guide rail 620 and a sliding base 630 slidably connected to the guide rail 620 are disposed on the desktop of the router table, and the sliding base 630 and the support grid structure 610 are locked through connection pieces.

When a force is applied to the support grid structure 610, the sliding base 630 may move along the guide rail 620, so as to adjust the position of the support grid structure 610 on the router table. To improve adjustment precision, a scale line is also disposed in a direction parallel to the guide rail 620 on the router table. The scale line may be used for precisely controlling a movement distance of the support grid structure 610 on the router table.

Specifically, an installation hole is disposed on the support grid structure 610, a first stud 641 is fixedly disposed on the sliding base 630, a connection end of the first stud 641 is welded, bonded, or integrally formed on the sliding base 630, and the first stud 641 passes through a corresponding installation hole and is threadedly connected to a first knob 642. The support grid structure 610 and the sliding base 630 can be locked by screwing the first knob 642.

In this example, two installation holes are arranged at intervals along a length direction of the support grid structure 610. Correspondingly, two guide rails 620 and two sliding bases 630 are respectively disposed in a one-to-one correspondence with the two installation holes.

Optionally, to improve the compactness between the support grid structure 610 and the router table, a guide rail groove is disposed on the router table, and the guide rail 620 is placed in the guide rail groove. In one example, to improve the stability of the sliding base 630 when sliding relative to the guide rail 620, a free end of the guide rail 620 is folded inward to form an inverted T-shaped groove in the guide rail 620, and the sliding base 630 is configured to be an inverted T-shaped structure fitting with the inverted T-shaped groove so that the guide rail 620 stably limits the sliding base 630.

Of course, in other examples, the guide rail 620, the sliding base 630, the first stud 641, and the first knob 642 are provided as one group and one group, two groups, or more than two groups may be provided according to requirements. Correspondingly, one, two, or more than two installation holes are disposed on the support grid structure 610.

Figure 7:
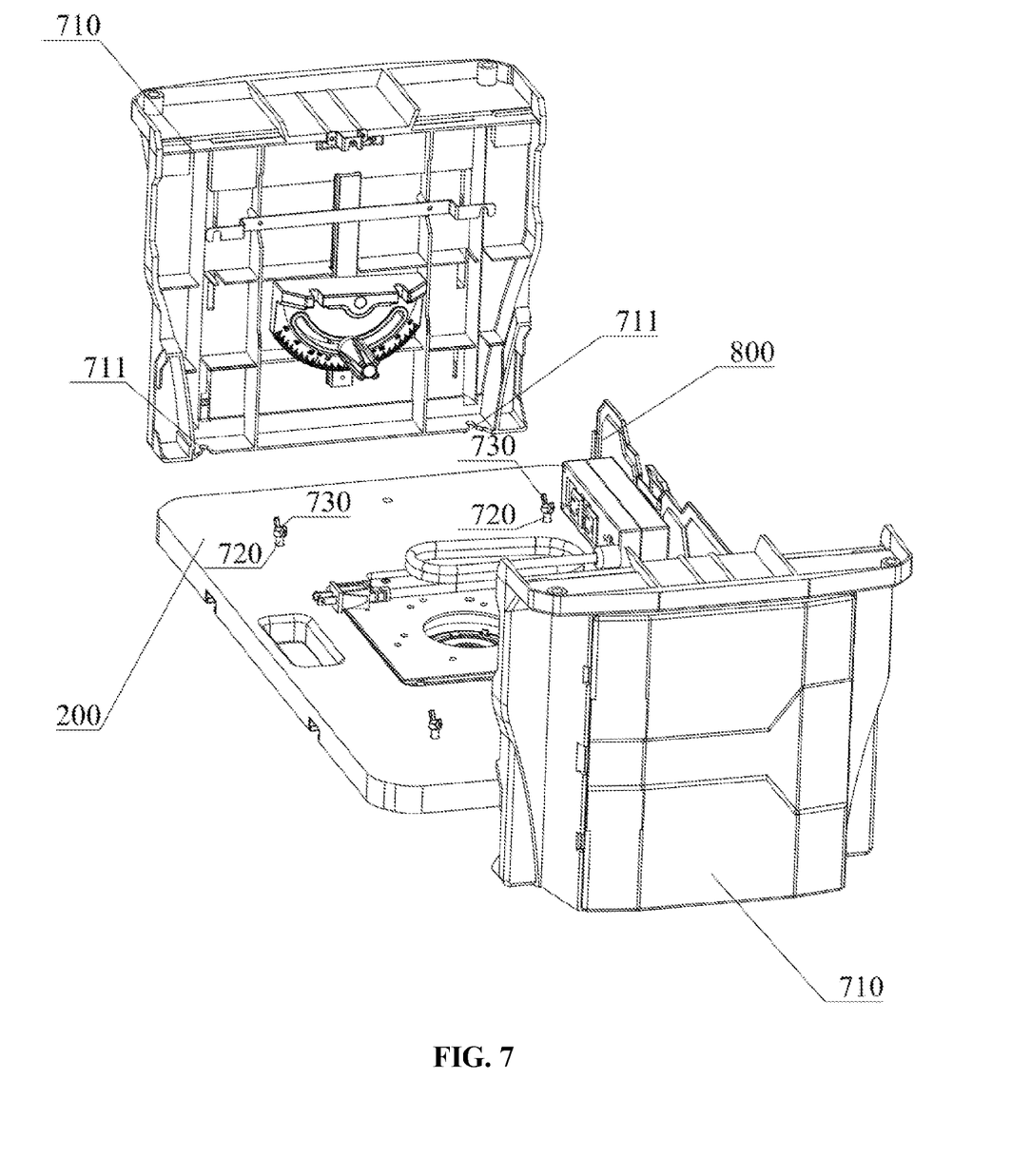
FIG. 7 is a view illustrating the assembly of a support leg and a mounting table of a power device according to an example of the present disclosure.

As shown in FIG. 7, the power device further includes a support leg 710, where the support leg 710 is connected to a bottom surface of the router table to stably support the router table. Two, three, four, or more support legs 710 may be provided according to requirements. In this example, the router table has two support legs 710, which are a left support leg and a right support leg, respectively. To connect the support leg 710 to the router table quickly and stably, a slot 711 is disposed at a top of the support leg 710. Optionally, the slot 711 is a slot with a U-shaped opening. Correspondingly, a second stud 720 protrudes out of the bottom surface of the router table, one end of the second stud 720 is fixed to the router table, the other end of the second stud 720 may pass through a bottom or a side portion of the slot 711, and a second knob 730 is threadedly connected to the second stud 720. The support leg 710 and the router table can be locked by screwing the second knob 730.

Optionally, to prevent the second stud 720 from slipping off a side of the slot 711, the slot 711 may be configured to be a narrowing structure with a relatively narrow opening and a relatively wide inside, and a diameter of the second stud 720 is made greater than a width of the opening of the slot 711 and less than a width of the inside of the slot 711. In one example, the second knob 730 is a claw knob to facilitate screwing.

In one example, as shown in FIG. 1, the power device further includes a front plate 800, where the front plate 800 is detachably connected between the left support leg and the right support leg. Optionally, one insertion block is disposed on each of the left support leg and the right support leg, one insertion groove is disposed at each of two ends of the front plate 800, and the insertion block may be inserted into the insertion groove so that the front plate 800 and the support leg 710 can be quickly assembled.

Figure 8:
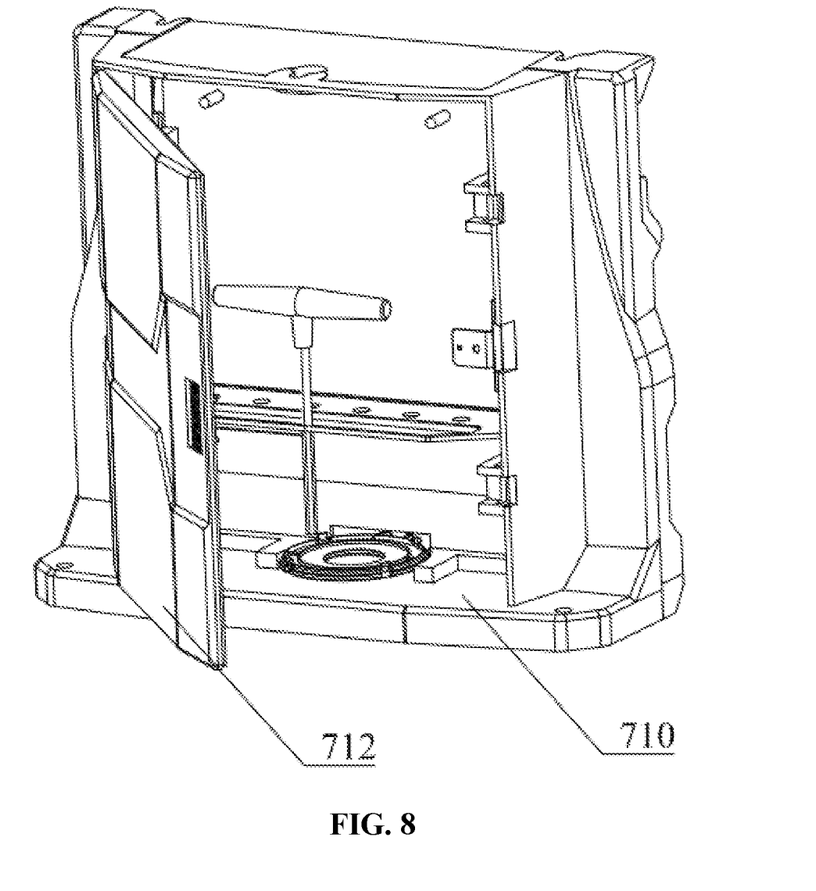
FIG. 8 is a structure view of a support leg according to an example of the present disclosure.

Referring to FIG. 8, the support leg 710 may also be used as a storage box, where the support leg 710 further includes an openable cover 712, and a space for storing a tool is formed inside the support leg 710.

The power device in the example of the present disclosure further includes a depth adjustment assembly configured to adjust an operation depth of an operation head of the router. Therefore, the mounting plate 100 is further provided with an escape hole that allows the depth adjustment assembly to pass through. The depth adjustment assembly may be a depth adjustment assembly that comes with the router or may be another independently configured depth adjustment assembly.

Figure 9:
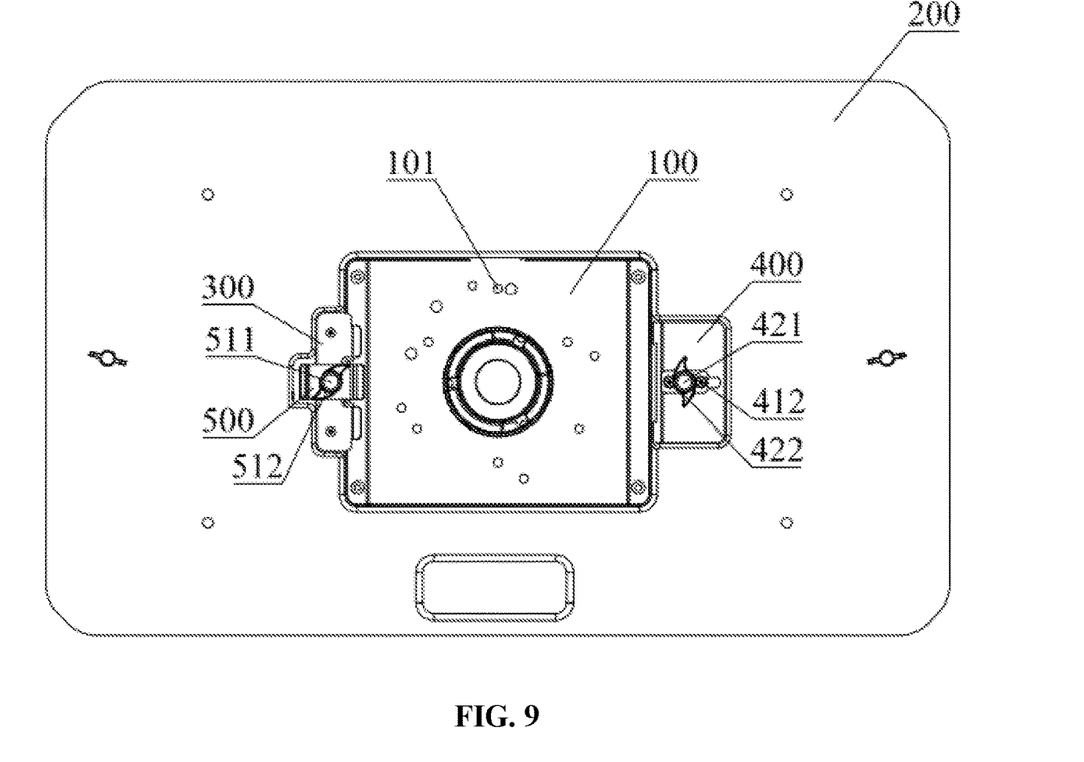
FIG. 9 is a view illustrating the assembly of a mounting plate and a mounting table of a power device according to another example of the present disclosure.
Figure 10:
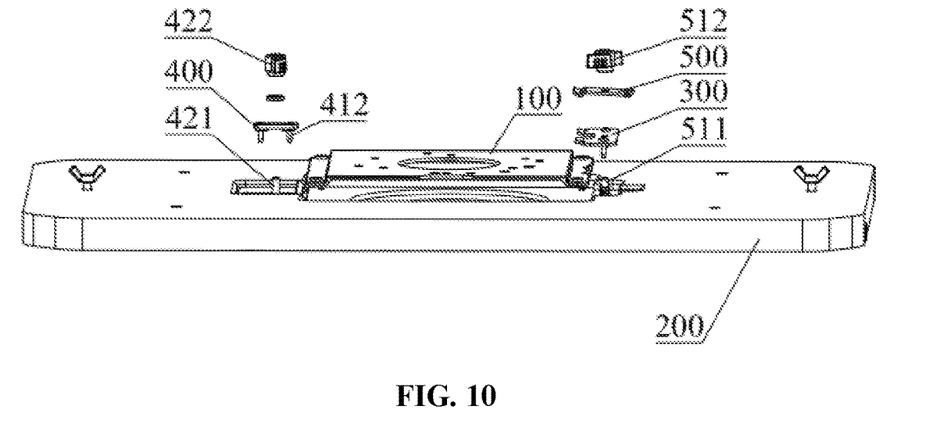
FIG. 10 is an exploded view of a mounting plate and a mounting table of a power device according to another example of the present disclosure.

FIGS. 9 and 10 illustrate another example in which the same or corresponding parts use corresponding reference numerals as those in the previous example. For brevity, only the difference between the two examples is described below: the mounting plate 100 is fixedly connected to the mounting table 200 indirectly.

In this example, the locking piece includes a first screw rod 421 and a first nut 422 screwed to the first screw rod 421, the first screw rod 421 is fixedly connected to the mounting table 200, and the first nut 422 can be screwed to the first screw rod 421, so as to lock the movable piece 400 and the mounting table 200. Since the movable piece 400 supports the mounting plate 100, the mounting plate 100 and the mounting table 200 can be locked.

During installation, the end of the mounting plate 100 is inserted into the positioning space so that the mounting plate 100 is pre-positioned, the movable piece 400 is moved to the support position, and the first nut 422 is screwed so that the mounting plate 100 and the mounting table 200 can be locked. During disassembly, the first nut 422 is unscrewed so that the movable piece 400 and the mounting table 200 can be unlocked, the movable piece 400 is moved to the unlocked position, and the mounting plate 100 is withdrawn from the positioning space. The screw rod fits with the nut and the nut is simply screwed so that the power device is installed by a simpler process and with high efficiency and can be used immediately after installation.

One, two, or more than two first screw rods 421 may be provided. To facilitate screwing, the first nut 422 is provided with a holding portion, so as to improve screwing efficiency. However, the first nut 422 occupies a relatively large space. To prevent the movable piece 400 from being touched by accident and displaced during screwing, the locking assembly further includes the guide rod 412, the movable piece 400 is provided with the guide groove, and both the first screw rod 421 and the guide rod 412 pass through the guide groove. The first screw rod 421 and the guide rod 412 fit with the guide groove to limit the movable piece 400 and prevent the movable piece 400 from rotating so that the movable piece 400 can only move along a straight line between the support position and the unlocked position.

Optionally, an elastic body passes through the first screw rod 421, and the first nut 422 abuts against the elastic body. When the first nut 422 is screwed, the elastic body is deformed; and when the first nut 422 is unscrewed, the elastic body is restored. The elastic body is provided so that the movable piece 400 can be quickly detached from the mounting table 200 when the mounting plate 100 is disassembled, thereby achieving quick disassembly. Optionally, the elastic body is a spiral spring.

In one example, to install the mounting plate 100 more stably, the power device further includes an auxiliary locking assembly. The auxiliary locking assembly includes a pressing piece 500 and an auxiliary locking piece. The pressing piece 500 can abut against a side of the mounting plate 100 facing away from the mounting table 200, and the auxiliary locking piece can lock the pressing piece 500 and the mounting table 200.

The pressing piece 500 in this example is a pressing plate. During installation, the end of the mounting plate 100 is inserted into the positioning space so that the mounting plate 100 is pre-positioned, the movable piece 400 is moved to the support position, and the locking piece fixes the movable piece 400 to the mounting table 200 to lock the mounting plate 100 and the mounting table 200. The pressing piece 500 abuts against the side of the mounting plate 100 facing away from the mounting table 200, and the auxiliary locking piece locks the pressing piece 500 and the mounting table 200. The auxiliary locking assembly cooperates with the locking assembly so that the mounting plate 100 is double-fixed and thus the mounting plate 100 is installed more stably.

Specifically, the auxiliary locking piece includes a second screw rod 511 and a second nut 512 screwed to the second screw rod 511, the second screw rod 511 is fixedly connected to the mounting table 200, and the second nut 512 can be screwed to the second screw rod 511, so as to abut against the pressing piece 500. The pressing piece 500 abuts against the side of the mounting plate 100 facing away from the mounting table 200, and the second nut 512 is screwed so that the pressing piece 500 and the mounting table 200 can be locked. The screw rod fits with the nut and the nut is simply screwed so that the power device is installed by a simpler process and with high efficiency and can be used immediately after installation.

In this example, the pressing piece 500 and the positioning piece 300 are disposed on the same side of the mounting plate 100. Specifically, the pressing piece 500 is disposed on an outer side of the positioning piece 300 and configured to press both the positioning piece 300 and the mounting plate 100 to fix the mounting plate 100.

Of course, the auxiliary locking assembly may also be staggered from positions of the positioning assembly and the locking assembly to fix another position of the mounting plate 100.

Optionally, to make the pressing piece 500 in full contact with the mounting plate 100, an escape groove is disposed at a middle position of the positioning piece 300, and the pressing piece 500 is disposed in a positioning groove. The second screw rod 511 is disposed without interference with the pre-positioning of the mounting plate 100 by the positioning piece 300.

Optionally, an elastic body passes through the second screw rod 511, and the pressing piece 500 abuts against the elastic body. When the second nut 512 is screwed, the elastic body is deformed; and when the second nut 512 is unscrewed, the elastic body is restored. The elastic body is provided so that the pressing plate can be quickly detached from the mounting table 200 when the mounting plate 100 is disassembled, thereby achieving quick disassembly. Optionally, the elastic body is a spiral spring.

The preceding examples of the present disclosure are only illustrative of the present disclosure and are not intended to limit the examples of the present disclosure. For those of ordinary skill in the art, changes or alterations in other different forms may also be made based on the preceding description. Implementations of the present disclosure cannot be and do not need to be all exhausted herein. Any modifications, equivalent substitutions, and improvements made within the spirit and principle of the present disclosure fall within the scope of the appended claims

What is claimed is:

1. A power device, comprising:
   a power tool;
   a mounting plate detachably connected to the power tool; and
   a mounting table for installation of the mounting plate, wherein the power device further comprises:
   a positioning assembly comprising a positioning piece, wherein a positioning space is formed between the positioning piece and the mounting table and an end of the mounting plate is insertable into the positioning space to pre-position the mounting plate, a locking assembly comprising a movable piece and a locking piece, wherein the movable piece comprises a support position in which the mounting plate is supported and an unlocked position in which support for the mounting plate is released and the locking piece fixes at least the mounting plate to the mounting table, and wherein the locking piece comprises at least one bolt and the at least one bolt fixedly connects the mounting plate to the mounting table.

2. The power device of claim 1, wherein the movable piece is provided with a guide groove, the mounting table is provided with a guide rod, the guide rod passes through the guide groove, and the movable piece is movable with respect to the mounting table through the guide groove.

3. The power device of claim 1, wherein the locking piece comprises a first screw rod and a first nut screwed to the first screw rod, the first screw rod is fixedly connected to the mounting table, and the first nut is enabled to be screwed to the first screw rod so as to lock the movable piece and the mounting table.

4. The power device of claim 3, further comprising an auxiliary locking assembly, wherein the auxiliary locking assembly comprises a pressing piece and an auxiliary locking piece, the pressing piece is capable of abutting against a side of the mounting plate facing away from the mounting table, and the auxiliary locking piece is capable of locking the pressing piece and the mounting table.

5. The power device of claim 4, wherein the auxiliary locking piece comprises a second screw rod and a second nut screwed to the second screw rod, the second screw rod is fixedly connected to the mounting table, and the second nut is enabled to be screwed to the second screw rod so as to abut against the pressing piece.

6. The power device of claim 4, wherein the pressing piece and the positioning piece are disposed on a same side of the mounting plate.

7. The power device of claim 1, wherein a foolproof assembly is disposed between the mounting table and the mounting plate, the foolproof assembly comprises a protrusion and a groove, one of the protrusion or the groove is disposed on the mounting table, the other of the protrusion or the groove is disposed on the mounting plate, and the protrusion is inserted into the groove while the end of the mounting plate is inserted into the positioning space.

8. The power device of claim 1, wherein the mounting plate is provided with a plurality of sets of positioning holes, each of the plurality of sets of positioning holes are arranged in a circle, and the plurality of sets of positioning holes are distributed on circles of different diameters.

9. The power device of claim 1, further comprising a depth adjustment assembly configured to adjust an operation depth of the power tool, wherein the mounting plate is provided with an escape hole that allows the depth adjustment assembly to pass through.

10. A method for installing a power tool to a mounting table through a mounting plate, comprising:
assembling, by a plurality of screws, the power tool with the mounting plate;
pre-positioning, by inserting an end of the mounting plate to a positioning space formed between a positioning piece and the mounting table, the mounting plate;
supporting, by moving a movable piece from an unlocked position to a support position, the mounting plate; and
fixing, by a locking piece, at least the mounting plate to the mounting table, wherein the locking piece comprises at least one bolt, wherein the at least one bolt fixedly connects the mounting plate to the mounting table.

11. The method of claim 10, wherein the movable piece is provided with a guide groove, the mounting table is provided with a guide rod, the guide rod passes through the guide groove, and the movable piece is movable with respect to the mounting table through the guide groove.

12. The method of claim 10, wherein the locking piece comprises a first screw rod and a first nut screwed to the first screw rod, the first screw rod is fixedly connected to the mounting table, and the first nut is enabled to be screwed to the first screw rod so as to lock the movable piece and the mounting table.

13. The method of claim 12, further comprising: locking, by an auxiliary locking piece, a pressing piece and the mounting table, wherein the pressing piece is capable of abutting against a side of the mounting plate facing away from the mounting table.

14. The method of claim 13, wherein the auxiliary locking piece comprises a second screw rod and a second nut screwed to the second screw rod, the second screw rod is fixedly connected to the mounting table, and the second nut is enabled to be screwed to the second screw rod so as to abut against the pressing piece.

15. The method of claim 13, wherein the pressing piece and the positioning piece are disposed on a same side of the mounting plate.

16. The method of claim 10, wherein a foolproof assembly is disposed between the mounting table and the mounting plate, the foolproof assembly comprises a protrusion and a groove, one of the protrusion or the groove is disposed on the mounting table, the other of the protrusion or the groove is disposed on the mounting plate, and the protrusion is inserted into the groove while the end of the mounting plate is inserted into the positioning space.

17. The method of claim 10, wherein the mounting plate is provided with a plurality of sets of positioning holes, each of the plurality of sets of positioning holes are arranged in a circle, and the plurality of sets of positioning holes are distributed on circles of different diameters.

18. The method of claim 10, further comprising: adjusting, by a depth adjustment assembly, an operation depth of the power tool, wherein the mounting plate is provided with an escape hole that allows the depth adjustment assembly to pass through.

* * * * *